(12) United States Patent
You

(10) Patent No.: US 9,851,539 B2
(45) Date of Patent: Dec. 26, 2017

(54) IMAGING LENS UNIT

(71) Applicant: Samsung Electro-Mechanics Co., Ltd., Suwon-si (KR)

(72) Inventor: Ho Sik You, Seongnam-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/255,240

(22) Filed: Sep. 2, 2016

(65) Prior Publication Data

US 2016/0370561 A1    Dec. 22, 2016

Related U.S. Application Data

(63) Continuation of application No. 14/473,938, filed on Aug. 29, 2014, now Pat. No. 9,523,839, which is a continuation of application No. 14/324,003, filed on Jul. 3, 2014, now abandoned, which is a continuation of application No. 14/106,578, filed on Dec. 13, 2013, now Pat. No. 8,810,929, which is a continuation of application No. 13/434,980, filed on Mar. 30, 2012, now Pat. No. 8,773,780.

(30) Foreign Application Priority Data

Oct. 10, 2011    (KR) .................. 10-2011-0103101

(51) Int. Cl.
   *G02B 9/60*    (2006.01)
   *G02B 13/00*    (2006.01)
   *G02B 27/00*    (2006.01)

(52) U.S. Cl.
   CPC .......... *G02B 13/0045* (2013.01); *G02B 9/60* (2013.01); *G02B 13/0015* (2013.01); *G02B 27/0025* (2013.01)

(58) Field of Classification Search
   CPC ... G02B 13/0045; G02B 9/60; G02B 27/0025
   USPC ........................................................ 359/764
   See application file for complete search history.

(56) References Cited

U.S. PATENT DOCUMENTS

| 7,443,610 B1 | 10/2008 | Lin et al. |
| 7,502,181 B2 | 3/2009 | Shinohara |
| 8,035,723 B2 | 10/2011 | Sano et al. |
| 8,072,695 B1 | 12/2011 | Lee et al. |

(Continued)

FOREIGN PATENT DOCUMENTS

| JP | 09-211320 A | 8/1997 |
| JP | 2007-298572 A | 11/2007 |

(Continued)

OTHER PUBLICATIONS

Non-Final Office Action dated Jan. 29, 2014 for related U.S. Appl. No. 13/434,980 (now issued as U.S. Pat. No. 8,773,780).

(Continued)

*Primary Examiner* — Jack Dinh
(74) *Attorney, Agent, or Firm* — NSIP Law

(57) ABSTRACT

Disclosed herein is an imaging lens unit, including: a first lens having a positive (+) power; a second lens having a negative (−) power; a third lens selectively having one of a positive (+) and negative (−) power; a fourth lens having a negative (−) power; and a fifth lens having a negative (−) power, wherein the first lens, the second lens, the third lens, the fourth lens, and fifth lens are arranged in order from an object to be formed as an image, and the fourth lens is concave toward an image side.

25 Claims, 12 Drawing Sheets

(56) References Cited

U.S. PATENT DOCUMENTS

| | | |
|---|---|---|
| 8,179,615 B1 | 6/2012 | Tang et al. |
| 8,264,784 B2 | 9/2012 | You |
| 8,325,429 B2 | 12/2012 | Tang et al. |
| 8,358,474 B2 | 1/2013 | Kwon |
| 8,395,851 B2 | 3/2013 | Tang et al. |
| 8,411,374 B2 | 4/2013 | Ohtsu |
| 8,411,376 B2 | 4/2013 | Kubota |
| 8,456,758 B1 | 6/2013 | Huang et al. |
| 8,498,061 B2 | 7/2013 | Sano |
| 8,520,124 B2 | 8/2013 | Ozaki |
| 8,576,498 B2 | 11/2013 | Huang |
| 8,675,288 B2 | 3/2014 | Jung et al. |
| 8,736,983 B2 | 5/2014 | Jo |
| 8,773,768 B2 | 7/2014 | Jung et al. |
| 8,773,769 B2 | 7/2014 | Jung et al. |
| 8,773,770 B2 | 7/2014 | Jung et al. |
| 8,773,780 B2 | 7/2014 | You |
| 8,773,781 B2 | 7/2014 | Jo |
| 8,780,465 B2 | 7/2014 | Chae |
| 8,786,966 B2 | 7/2014 | You |
| 8,810,929 B2 | 8/2014 | You |
| 8,830,596 B2 | 9/2014 | Jo |
| 2007/0229984 A1 | 10/2007 | Chinohara |
| 2010/0220229 A1 | 9/2010 | Sano |
| 2010/0253829 A1 | 10/2010 | Shinohara |
| 2010/0254029 A1 | 10/2010 | Shinohara |
| 2011/0013069 A1 | 1/2011 | Chen |
| 2011/0134305 A1 | 6/2011 | Sano et al. |
| 2011/0164327 A1 | 7/2011 | Sato |
| 2011/0188131 A1 | 8/2011 | Sano |
| 2011/0249346 A1 | 10/2011 | Tang et al. |
| 2011/0273611 A1 | 11/2011 | Matsusaka et al. |
| 2012/0087019 A1 | 4/2012 | Tang et al. |
| 2012/0087020 A1 | 4/2012 | Tang et al. |
| 2012/0140104 A1 | 6/2012 | Ozaki |
| 2012/0314301 A1 | 12/2012 | Huang et al. |
| 2013/0027788 A1 | 1/2013 | Yen |
| 2013/0050847 A1 | 2/2013 | Hsu et al. |
| 2013/0070346 A1 | 3/2013 | Hsu et al. |
| 2013/0088788 A1 | 4/2013 | You |
| 2013/0093938 A1 | 4/2013 | Otsu |
| 2013/0094098 A1 | 4/2013 | Ko |
| 2013/0114151 A1 | 5/2013 | Chen et al. |
| 2013/0120858 A1 | 5/2013 | Sano |
| 2013/0201568 A1 | 8/2013 | Tsai et al. |
| 2013/0208174 A1 | 8/2013 | Tamura |
| 2013/0271642 A1 | 10/2013 | Sano |
| 2013/0286488 A1 | 10/2013 | Chae |
| 2013/0301147 A1 | 11/2013 | Yamada |
| 2013/0314803 A1 | 11/2013 | Huang et al. |
| 2013/0329307 A1 | 12/2013 | Jung et al. |
| 2013/0335622 A1 | 12/2013 | Kwon |
| 2013/0342919 A1 | 12/2013 | Tang et al. |
| 2014/0015991 A1 | 1/2014 | Yamada et al. |
| 2014/0104704 A1 | 4/2014 | Chae |
| 2014/0139935 A1 | 5/2014 | Hsieh et al. |
| 2014/0146402 A1 | 5/2014 | You |
| 2014/0218812 A1 | 8/2014 | Liou et al. |
| 2014/0254030 A1 | 9/2014 | Hsu et al. |
| 2014/0285907 A1 | 9/2014 | Tang et al. |
| 2014/0307149 A1 | 10/2014 | Chen et al. |
| 2014/0320986 A1 | 10/2014 | You |
| 2014/0368928 A1 | 12/2014 | Jo |
| 2014/0368929 A1 | 12/2014 | Chae |
| 2014/0368930 A1 | 12/2014 | Jung et al. |

FOREIGN PATENT DOCUMENTS

| | | |
|---|---|---|
| JP | 2009-294528 A | 12/2009 |
| JP | 2010-258608 A | 11/2010 |
| JP | 2011-39091 A | 2/2011 |
| JP | 2011-85733 A | 4/2011 |
| JP | 2011-138175 A | 7/2011 |
| JP | 2011-141396 A | 7/2011 |
| JP | 2011-158508 A | 8/2011 |
| JP | 2011-209554 A | 10/2011 |
| JP | 2011-257448 A | 12/2011 |
| JP | 2012-8164 A | 1/2012 |
| JP | 2012-73642 A | 4/2012 |
| JP | 2013-11710 A | 1/2013 |
| JP | 2013-54099 A | 3/2013 |
| KR | 10-2007-0097369 A | 10/2007 |
| KR | 10-2010-0001525 A | 1/2010 |
| KR | 10-2010-0043667 A | 4/2010 |
| KR | 10-2011-0042382 A | 4/2011 |
| KR | 10-2011-0057625 A | 6/2011 |
| KR | 10-2011-0071554 A | 6/2011 |
| KR | 10-2011-0140040 A | 12/2011 |
| KR | 10-2012-0018573 A | 3/2012 |
| KR | 10-2012-0033866 A | 4/2012 |
| TW | 201248187 A1 | 12/2012 |
| TW | 201326884 A1 | 7/2013 |
| TW | 201333517 A1 | 8/2013 |
| TW | 201341840 A | 10/2013 |
| TW | 201348732 A | 12/2013 |
| WO | WO 2010/024198 A1 | 3/2010 |
| WO | WO 2011/021271 A1 | 2/2011 |
| WO | WO 2011/027960 A1 | 3/2011 |

OTHER PUBLICATIONS

Final Office Action dated Sep. 3, 2013 for related U.S. Appl. No. 13/434,980 (now issued as U.S. Pat. No. 8,773,780).
Non-Final Office Action dated Feb. 8, 2013 for related U.S. Appl. No. 13/434,980 (now issued as U.S. Pat. No. 8,773,780).
Notice of Allowance dated Jun. 26, 2014 for related U.S. Appl. No. 14/106,578 (now issued as U.S. Pat. No. 8,810,929).
Non-Final Office Action dated Jan. 29, 2014 for related U.S. Appl. No. 14/106,578 (now issued as U.S. Pat. No. 8,810,929).
Notice of Allowance dated Jun. 10, 2014 for related U.S. Appl. No. 14/106,598 (now issued as U.S. Pat. No. 8,786,966).
Non-Final Office Action dated Apr. 2, 2014 for related U.S. Appl. No. 14/106,598 (now issued as U.S. Pat. No. 8,786,966).
Office Action dated Sep. 2, 2014 for corresponding U.S. Appl. No. 14/324,003.
Office Action issued for related Korean Patent Application No. 10-2011-0103101, dated Jan. 21, 2013, and its English summary provided by the Applicant's foreign counsel.
Notice of Allowance dated May 22, 2014 for related U.S. Appl. No. 13/434,980 (now issued as U.S. Pat. No. 8,773,780).
Final Office Action dated Mar. 25, 2014 for related U.S. Appl. No. 13/434,980 (now issued as U.S. Pat. No. 8,773,780).
Office Action dated Feb. 26, 2014 and Prior Art Search Report for Korean Patent Appl. No. 10-2014-0003271 and its English translation provided by the Applicant's foreign counsel.
Office Action dated Jul. 1, 2013 for Korean Patent Appl. No. 10-2012-0045609 and its English translation provided by the Applicant's foreign counsel.
Office Action dated Aug. 26, 2014 for Korean Patent Appl. No. 10-2014-0097555 and its English translation provided by the Annlicant's foreign counsel.
Office Action dated Aug. 27, 2014 for Korean Patent Appl. No. 10-2013-0065734 and its English swnmary provided by the Annlicant's foreign counsel.
Office Action dated Aug. 29, 2014 for Korean Patent Appl. No. 10-2014-0097556 and its English swnmary provided by the Applicant's foreign counsel.
Office Action dated Sep. 25, 2013 for Japanese Patent Appl. No. 2012-181553 and its English swnmarv provided bv the Annlicant's forei!.m counsel.
Office Action dated Jan. 28, 2014 and Prior Art Search Report for Korean Patent Appl. No. 10-2013-0150984 and its English translation provided by the Applicant's foreign counsel.
Office Action dated Jan. 28, 2013 for Korean Patent Appl. No. 10-2011-0108128 and its English swnmary provided by Applicant's foreign counsel.
Office Action dated Nov. 26, 2014 for Taiwanese Patent Appl. No. 102144927 and its English swnmary provided by Applicant's foreign counsel.

(56) References Cited

OTHER PUBLICATIONS

Notice of Allowance dated Mar. 27, 2014 for U.S. Appl. No. 13/533,769 (now issued as U.S. Pat. No. 8,736,983).
Non-Final Office Action dated Sep. 5, 2013 for U.S. Appl. No. 13/533,769 (now issued as U.S. Pat. No. 8,736,983).
Notice of Allowance dated May 30, 2014 for U.S. Appl. No. 14/135,152 (now issued as U.S. Pat. No. 8,773,781).
Non-Final Office Action dated Apr. 3, 2014 for U.S. Appl. No. 14/135,152 (now issued as U.S. Pat. No. 8,773,781).
Non-Final Office Action dated May 23, 2014 for related U.S. Appl. No. 14/169,121 (now published as U.S. 2014/0146402).
Non-Final Office Action dated Mar. 18, 2014 for U.S. Appl. No. 14/137,795 (now published as US. 2014/0104704).
Notice of Allowance dated Jan. 23, 2015 for U.S. Appl. No. 14/473,904 (now published as US. 2014/0368928).
Office Action dated Oct. 10, 2014 for U.S. Appl. No. 14/473,904 (now published 2014/0368928).
Office Action dated Nov. 25, 2014 for U.S. Appl. No. 14/473,985 (now published as US 2014/0368930).
Final Office Action dated Jan. 12, 2015 for U.S. Appl. No. 14/473,956 (now published as US 2014/0368929).
Non-Final Office Action dated Oct. 10, 2014 for U.S. Appl. No. 14/473,956 (now published as US 2014/0368929).
Notice of Allowance dated Nov. 6, 2013 for U.S. Appl. No. 13/588,208 (now issued as U.S. Pat. No. 8,675,288).
Notice of Allowance dated May 14, 2014 for U.S. Appl. No. 14/105,096 (now issued as U.S. Pat. No. 8,773,768).
Non-Final Office Action dated Mar. 4, 2014 for U.S. Appl. No. 14/105,096 (now issued as U.S. Pat. No. 8,773,768).
Notice of Allowance dated May 28, 2014 for U.S. Appl. No. 14/105,105 (now issued as U.S. Pat. No. 8,773,769).
Final Office Action dated May 12, 2014 for U.S. Appl. No. 14/105,105 (now issued as U.S. Pat. No. 8,773,769).
Non-Final Office Action dated Feb. 7, 2014 for U.S. Appl. No. 14/105,105 (now issued as U.S. Pat. No. 8,773,769).
Notice of Allowance dated May 22, 2014 for U.S. Appl. No. 14/105,122 (now issued as U.S. Pat. No. 8,773,770).
Final Office Action dated May 12, 2014 for U.S. Appl. No. 14/105,122 (now issued as U.S. Pat. No. 8,773,770).
Non-Final Office Action dated Feb. 4, 2014 for U.S. Appl. No. 14/105,122 (now issued as U.S. Pat. No. 8,773,770).
Notice of Allowance dated Jul. 21, 2014 for U.S. Appl. No. 14/135,203 (now issued as U.S. Pat. No. 8,830,596).
Non-Final Office Action dated Jun. 5, 2014 for U.S. Appl. No. 14/135,203 (now issued as U.S. Pat. No. 8,830,596).
Non-Final Office Action dated Feb. 26, 2014 for U.S. Appl. No. 14/135,203 (now issued as U.S. Pat. No. 8,830,596).
Notice of Allowance dated May 12, 2014 for U.S. Appl. No. 14/137,683 (now issued as U.S. Pat. No. 8,780,465).
Non-Final Office Action dated Feb. 27, 2014 for U.S. Appl. No. 14/137,683 (now issued as U.S. Pat. No. 8,780,465).
Non-Final Office Action dated Jul. 30, 2014 for U.S. Appl. No. 13/802,247 (now published as U.S. 2013/0286488).
Non-Final Office Action dated May 9, 2014 for U.S. Appl. No. 13/802,247 (now published as U.S. 2013/0286488).
Non-Final Office Action dated Mar. 11, 2014 for U.S. Appl. No. 13/802,247 (now published as U.S. 2013/0286488).
Final Office Action dated Aug. 20, 2014 for U.S. Appl. No. 14/137,795 (now published as U.S. 2014/0104704).
Non-Final Office Action dated Jun. 3, 2014 for U.S. Appl. No. 14/137,795 (now published as U.S. 2014/0104704).
Final Office Action dated May 8, 2014 for U.S. Appl. No. 14/137,795 (now published as U.S. 2014/0104704).
U.S. Office Action dated Jul. 7, 2015 in related U.S. Appl. No. 14/169,121 (4 pages, in English).
U.S. Office Action dated Feb. 3, 2016 in counterpart U.S. Appl. No. 14/169,121 (6 pages in English).

IMAGING LENS UNIT

CROSS REFERENCE TO RELATED APPLICATION(S)

This application is a Continuation of U.S. application Ser. No. 14/473,938, filed on Aug. 29, 2014, which is a continuation of U.S. patent application Ser. No. 14/324,003, filed Jul. 3, 2014, which is a continuation of U.S. Pat. No. 8,810,929, issued on Aug. 19, 2014 (U.S. patent application Ser. No. 14/106,578, filed on Dec. 13, 2013), which is a continuation of U.S. Pat. No. 8,773,780, issued on Jul. 8, 2014 (U.S. patent application Ser. No. 13/434,980, filed on Mar. 30, 2012), which claims the benefit of Korean Patent Application No. 10-2011-0103101, filed Oct. 10, 2011, entitled "Image Lens Unit", which are hereby incorporated by reference in their entireties into this application.

BACKGROUND OF THE INVENTION

1. Technical Field

The present invention relates to an imaging lens unit.

2. Description of the Related Art

Recently, due to the advancement in technology, mobile terminals such as mobile phones and personal digital assistants (PDAs) are currently used for not only making simple phone calls but to also perform functions for multi-convergence such as playing music or movies, watching TV, and playing games. One of the leading factors for such multi-convergence is a camera module.

In general, a compact camera module (CCM) has a compact size and is applied to portable mobile communication devices such as camera phones, PDAs, and smartphones and various information technology (IT) devices such as toy cameras. Presently, CCMs are being installed in various devices in order to meet demands of consumers having specific preferences As the CCMs have to perform various functions using a compact optical system, various techniques are used to make the modules slim. In addition to the slim size, demands for image quality of the compact optical system are also increasing, and thus development of slim optical system providing a high image quality is required.

Thus, recently, an imaging lens unit constituting a high resolution imaging lens by using five lenses having positive (+) refractive power and negative (−) refractive power has been developed.

However, the imaging lens unit having five lenses described above cannot provide normal optical characteristics or aberration characteristics as desired by users according to predetermined conditions.

SUMMARY OF THE INVENTION

The present invention has been made in an effort to provide an imaging lens unit having five lenses and satisfying conditions of optical characteristics desired by users and showing excellent aberration characteristics.

According to a first preferred embodiment of the present invention, there is provided an imaging lens unit, including: a first lens having a positive (+) power; a second lens having a negative (−) power; a third lens selectively having one of a positive (+) and negative (−) power; a fourth lens having a negative (−) power; and a fifth lens having a negative (−) power, wherein the first lens, the second lens, the third lens, the fourth lens, and fifth lens are arranged in order from an object to be formed as an image, and the fourth lens is concave toward an image side.

The fourth lens may be a meniscus-shaped lens.

An Abbe number v4 of the fourth lens may satisfy the following conditional expression:

$$0<v4<30.$$

The second lens and the fourth lens may be formed of a high dispersion material.

An Abbe number v1 of the first lens may satisfy the following conditional expression:

$$50<v1.$$

An Abbe number v2 of the second lens may satisfy the following conditional expression:

$$0<v2<30.$$

The first lens may have a convex form toward an object side.

The second lens may have a concave form toward the image side.

The fifth lens may have an inflection point toward the image side.

The third lens may have negative (−) power.

The third lens may have positive (+) power.

The imaging lens unit may further include an aperture stop disposed in front of the first lens to adjust a light amount.

The imaging lens unit may further include an aperture stop disposed between the first lens and the second lens to adjust a light amount.

The first lens, the second lens, the third lens, and the fourth lens may all be made of a plastic material.

A total focal length f of the imaging lens unit, a curvature radius r7 of the fourth lens on the object side, and a curvature radius r8 of the fourth lens on the image side may satisfy the following conditional expression:

$$0<(r7+r8)/(r7-r8)<-2.5.$$

A total focal length f of the imaging lens unit and a distance tt from a vertex of the first lens on the object side to the image side may satisfy the following conditional expression:

$$0<tt/f<1.3.$$

An Abbe number v1 of the first lens, an Abbe number v2 of the second lens, an Abbe number v3 of the third lens, and an Abbe number v4 of the fourth lens may satisfy the following conditional expression:

$$0.7<(v1+v2)/(v3+v4)<1.0.$$

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DESCRIPTION OF THE PREFERRED EMBODIMENTS

Figure 1:
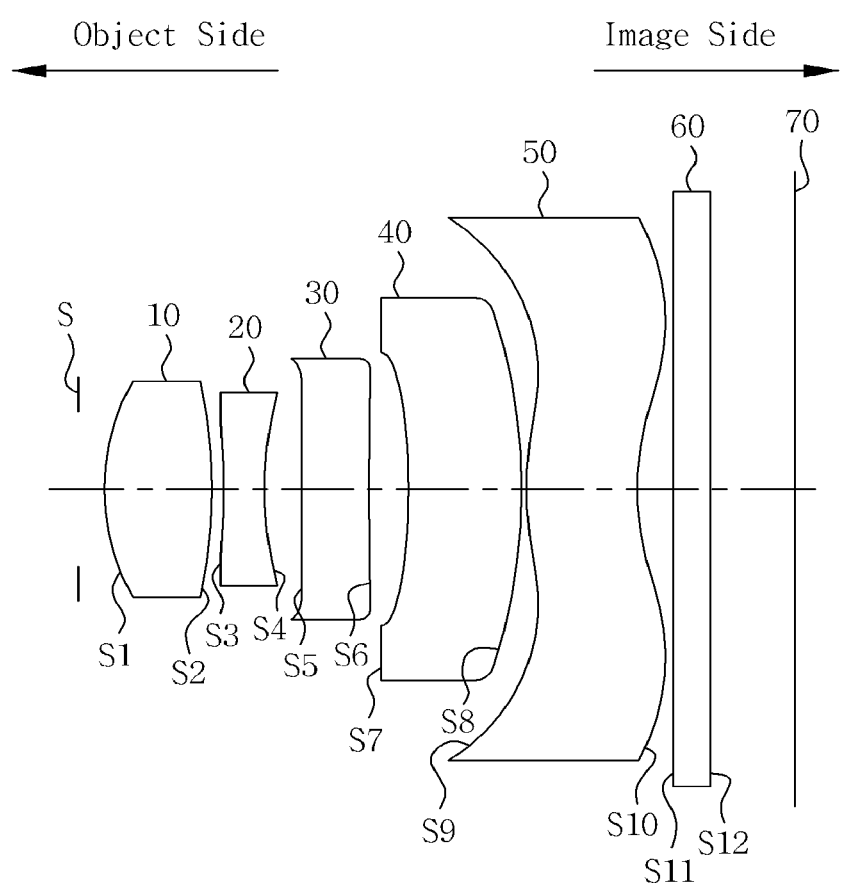
FIG. 1 is a cross-sectional view schematically illustrating an internal structure of an imaging lens unit according to a first embodiment of the present invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", "one surface", "the other surface" and so on are used to distinguish one element from another element, and the elements are not defined by the above terms. In describing the present invention, a detailed description of related known functions or configurations will be omitted so as not to obscure the gist of the present invention.

Hereinafter, preferred embodiments of the present invention will be described in detail with reference to the accompanying drawings.

First Embodiment

FIG. 1 is a cross-sectional view schematically illustrating an internal structure of an imaging lens unit according to a first embodiment of the present invention. As illustrated in FIG. 1, the imaging lens unit according to the first embodiment of the present invention includes, in order from an object side of an object, which is to be formed as an image, a first lens 10, a second lens 20, a third lens 30, a fourth lens 40, a fifth lens 50, a filter 60, and an image sensor 70.

Also, an aperture stop S that adjusts a light amount of incident light that is incident from the object to be formed as an image and a focal depth may be disposed toward the object side to be separated a predetermined distance from the first lens 10.

Accordingly, the light amount of the object to be imaged passes through each of the first lens 10, the second lens 20, the third lens 30, the fourth lens 40, and the fifth lens 50 to be incident on the image sensor 70.

Also, the filter 60 may be formed of an ultraviolet ray blocking filter (IR cut filter), that prevents ultraviolet rays emitted from the incident light that is incident therethrough from being transmitted to the image sensor 70 disposed on an image side.

In detail, the first lens 10 has positive (+) power, and the second lens 20 has negative (−) power, the third lens 30 has negative (−) power, the fourth lens 40 has negative (−) power, and the fifth lens 50 has negative (−) power.

Also, the first lens 10 is convex toward the object side, and an Abbe number v1 of the first lens 10 satisfies the following conditional expression:

$$50<v1.\qquad\text{Conditional expression (1):}$$

Also, the second lens 20 is concave toward the image side, and an Abbe number v2 of the second lens 20 satisfies the following conditional expression:

$$0<v2<30.\qquad\text{Conditional expression (2):}$$

Also, the fourth lens 40 is concave toward the image side and has a meniscus shape, and an Abbe number v4 of the fourth lens 40 satisfies the following conditional expression:

$$0<v4<30.\qquad\text{Conditional expression (3):}$$

Also, the fifth lens 50 has an inflection point toward the image side.

In addition, the second lens 20 and the fourth lens 40 are made of a high dispersion material.

The imaging lens unit according to the first embodiment of the present invention illustrated in FIG. 1 satisfies the above-described conditional expressions (1), (2), and (3), and also satisfies the following conditional expressions, thus providing excellent aberration characteristics and high resolving power.

$$0<(r7+r8)/(r7-r8)<-2.5\qquad\text{Conditional expression (4):}$$

$$0<tt/f<1.3\qquad\text{Conditional expression (5):}$$

$$0.7<(v1+v2)/(v3+v4)<1.0\qquad\text{Conditional expression (6):}$$

Here, the symbols denote the following:
f: total focal length of the imaging lens unit
r7: curvature radius of the fourth lens 40 at the object side
r8: curvature radius of the fourth lens 40 at the image side
tt: distance between a vertex of the first lens 10 at the object side and the image side
v1: Abbe number of the first lens 10
v2: Abbe number of the second lens 20
v3: Abbe number of the third lens 30
v4: Abbe number of the fourth lens 40

Also, aspheric constants of the imaging lens unit according to the first embodiment of the present invention may be obtained using Equation 1 below.

$$Z(h) = \frac{ch^2}{1+\sqrt{1-(1+k)c^2h^2}} + Ah^4 + Bh^6 + Ch^8 + Dh^{10} + Eh^{12} + Fh^{14} \qquad\text{[Equation 1]}$$

Z: distance from a vertex of a lens to an optical axis direction
c: basic curvature of a lens
h: distance from a vertex of a lens to a direction perpendicular to the optical axis K; Conic constant A, B, C, D, E, F: aspheric constants Here, the alphabet E used with a conic constant K or with an aspheric constant A, B, C, D, E, or F and a number connected to the alphabet E by a hyphen "–" denote the involution of 10.

For example, "E+01" denotes $10^1$, and "E-01" denotes $10^{-1}$.

Table 1 below shows design data of the lenses of the imaging lens unit according to the first embodiment of the present invention.

TABLE 1

| Lens number | Lens surface number | Curvature radius (mm) | Thickness (mm) | Index | Abbe number |
|---|---|---|---|---|---|
| First lens | S1 | 1.763 | 0.900 | 1.534 | 56.200 |
|  | S2 | −5.672 | 0.063 |  |  |
| Second lens | S3 | −9.198 | 0.364 | 1.614 | 25.600 |
|  | S4 | 4.163 | 0.308 |  |  |
| Third lens | S5 | 14.875 | 0.551 | 1.534 | 56.200 |
|  | S6 | 11.495 | 0.305 |  |  |
| Fourth lens | S7 | −4.748 | 0.900 | 1.614 | 25.600 |
|  | S8 | −5.587 | 0.058 |  |  |
| Fifth lens | S9 | 2.809 | 0.900 | 1.534 | 56.200 |
|  | S10 | 1.784 | 0.300 |  |  |
| Filter | S11 | 000 | 0.300 | 1.517 | 64.197 |
|  | S12 | 000 | 0.700 |  |  |

As shown in Table 1, an Abbe number v1 of the first lens 10 according to the first embodiment of the present invention is 56.200, thus satisfying Conditional expression (1).

Also, an Abbe number v2 of the second lens 20 is 25.600, thus satisfying Conditional expression (2).

Also, an Abbe number v4 of the fourth lens 40 is 25.600, thus satisfying Conditional expression (3).

In addition, it can be seen from a curvature radius of the fourth lens 40 that Conditional expression (4) is satisfied. In addition, it can be seen from Abbe numbers of the first lens 10, the second lens 20, and the fourth lens 40 that Conditional expression (6) is satisfied.

Table 2 below shows aspheric constants of the lenses of the imaging lens unit according to the first embodiment of the present invention.

TABLE 2

| Lens number | Lens surface number | K | A | B | C | D | E | F |
|---|---|---|---|---|---|---|---|---|
| First lens | S1 | −1.0691E+00 | 1.2819E−02 | −1.2774E−02 | 7.1902E−03 | −1.9070E−02 |  |  |
|  | S2 | −3.6984E+01 | −7.3735E−03 | −7.9849E−02 | 2.3367E−02 | 2.6266E−03 |  |  |
| Second lens | S3 | 0.0000E+00 | 7.4005E−02 | −7.3221E−02 | 1.9838E−02 | 2.5006E−02 |  |  |
|  | S4 | 1.4763E+01 | 2.4962E−02 | 1.1805E−02 | −1.7987E−02 | 1.0340E−02 |  |  |
| Third lens | S5 | 0.0000E+00 | −6.9792E−02 | −7.6877E−03 | 3.2156E−02 | −3.1754E−02 |  |  |
|  | S6 | 0.0000E+00 | 6.8123E−03 | −8.2799E−02 | 5.8992E−02 | −2.0776E−02 |  |  |
| Fourth lens | S7 | −1.0154E+02 | −1.1014E−03 | −1.7923E−02 | −6.7548E−02 | 5.6115E−02 | −1.8166E−02 |  |
|  | S8 | −7.9624E+00 | 3.4197E−02 | −3.3333E−02 | 7.9714E−03 | −6.9532E−04 | 1.0098E−05 |  |
| Fifth lens | S9 | −1.0389E+01 | −9.0596E−02 | 2.2209E−02 | −3.7819E−03 | 5.0937E−04 | −4.6163E−05 |  |
|  | S10 | −6.3248E+00 | −4.9536E−02 | 1.1043E−02 | −1.9780E−03 | 1.9725E−04 | −9.8808E−06 |  |

Below, Table 3 shows focal lengths (Focal Length Tolerance, EFL) of the lenses of the imaging lens unit according to the first embodiment of the present invention, and according to the above conditional expressions.

TABLE 3

| Lens number | Focal length |
|---|---|
| First lens | 2.629 |
| Second lens | −4.619 |
| Third lens | −100.407 |
| Fourth lens | −87.132 |
| Fifth lens | −13.178 |
| Ass'y | 4.9455 |

As shown in Table 3, it can be seen from the focal length of the first lens 10 according to the first embodiment of the present invention that Conditional expression (5) is satisfied.

Figure 2:
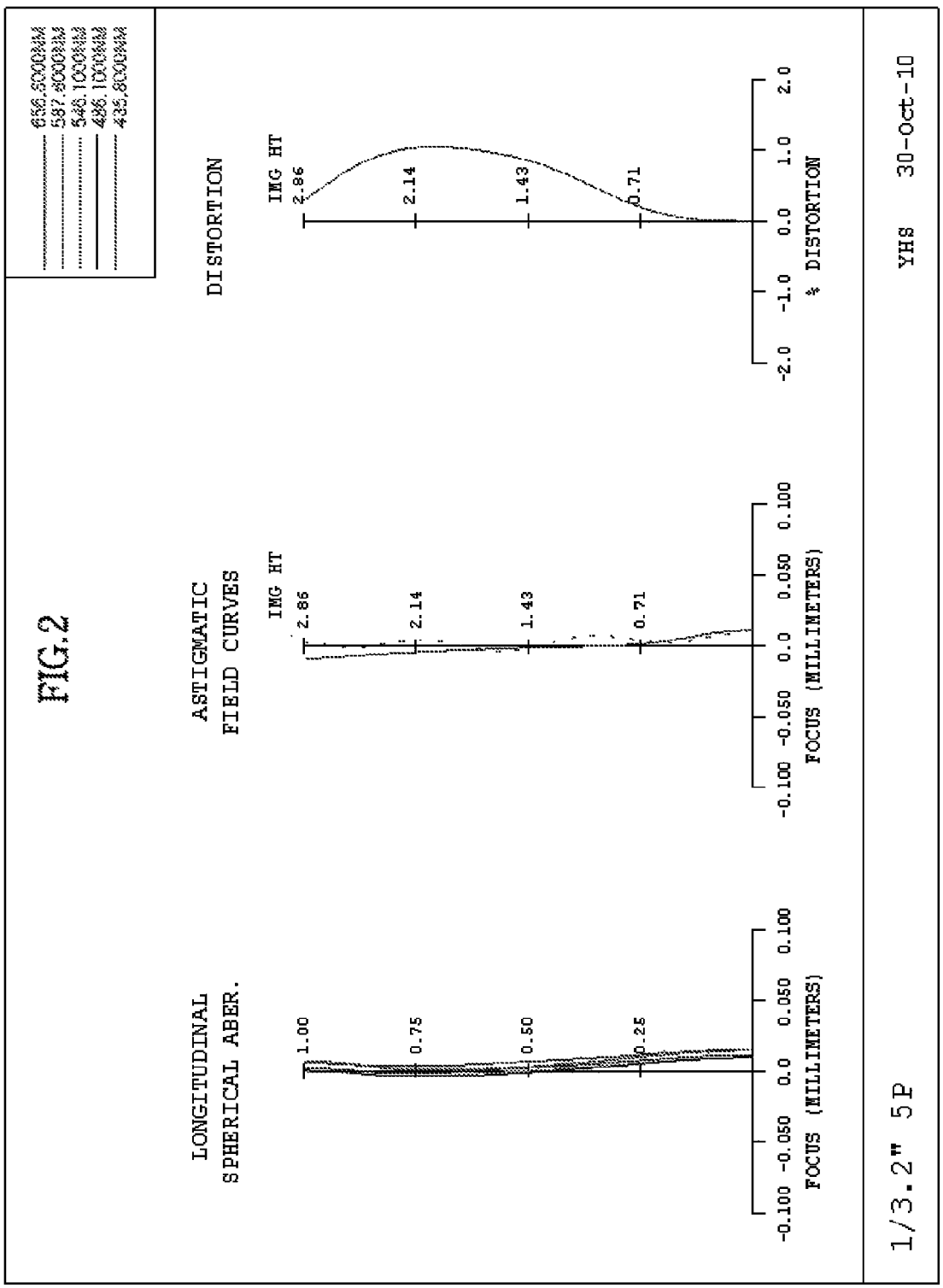
FIG. 2 is a graph showing aberrations of the imaging lens unit according to the first embodiment of the present invention.

FIG. 2 is a graph showing aberrations of the imaging lens unit according to the first embodiment of the present invention. As illustrated in FIG. 2, the graph shows longitudinal spherical aberration, astigmatic field curves, and distortion.

A Y-axis of the graph of FIG. 2 denotes an image height, and an X-axis denotes a focal length (unit: mm) and distortion (unit: %).

Also, with regard to interpretation of the graph of FIG. 2, it may be interpreted that the closer the curves of the graph are to the Y-axis, the better is an aberration correction function. Referring to the graph of FIG. 2, experimental data values measured according to the first embodiment of the present invention are close to the Y-axis in almost all areas.

Accordingly, the imaging lens unit according to the first embodiment of the present invention has excellent characteristics regarding spherical aberration, astigmatism, and distortion.

Figure 3:
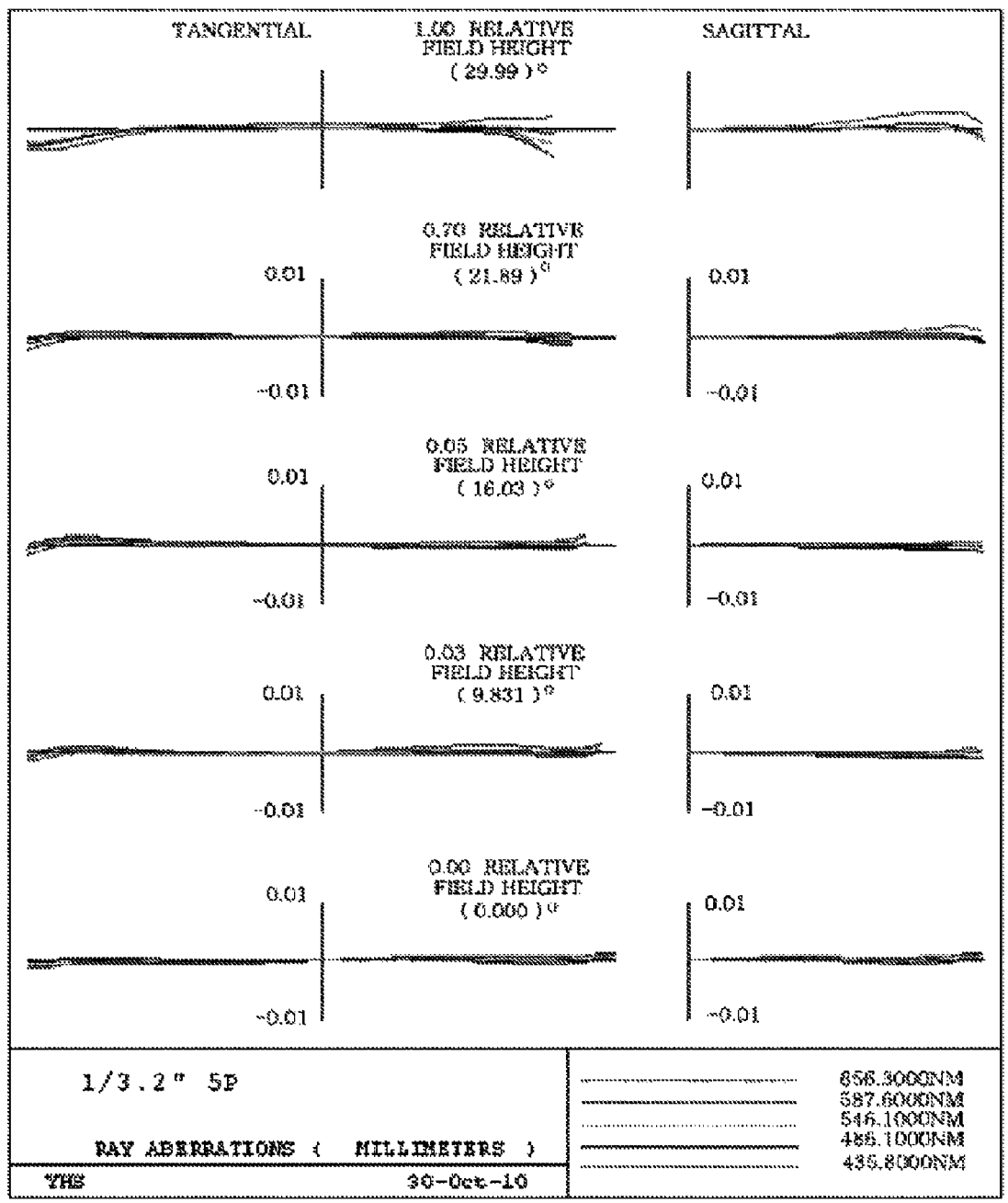
FIG. 3 is a graph showing coma aberration of the imaging lens unit according to the first embodiment of the present invention.

FIG. 3 is a graph showing coma aberration of the imaging lens unit according to the first embodiment of the present invention. As illustrated in FIG. 3, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 3, experimental data values measured according to the first embodiment of the present invention are close to the X-axis in almost all areas.

Thus, the imaging lens unit according to the first embodiment of the present invention provides an excellent coma aberration correction function.

Second Embodiment

Figure 4:
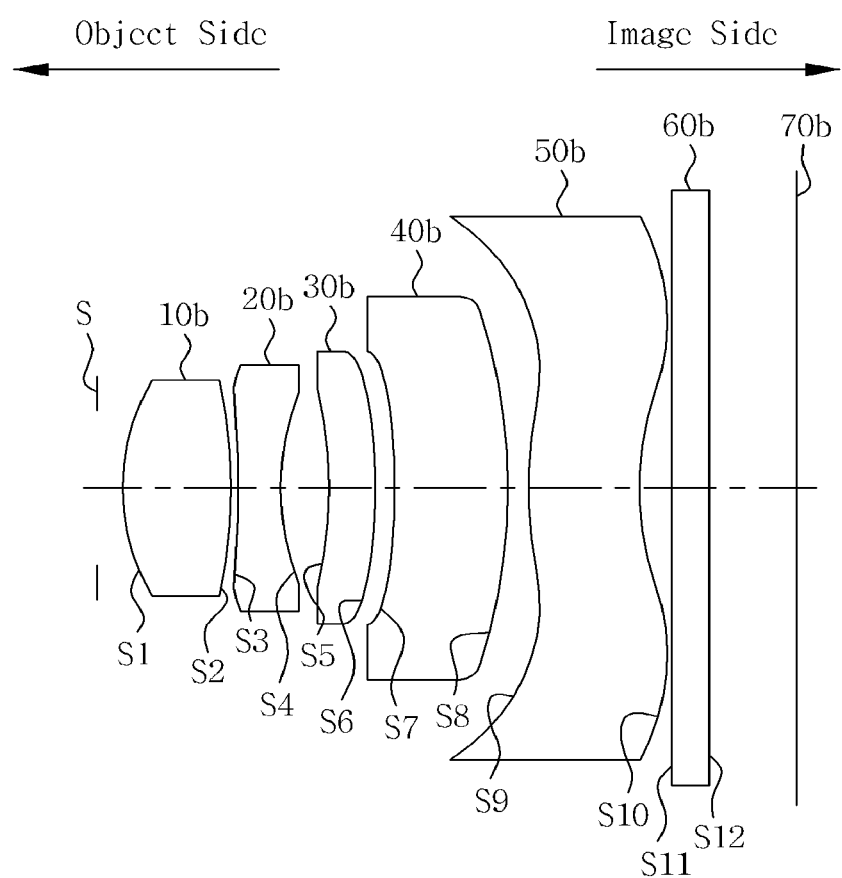
FIG. 4 is a cross-sectional view schematically illustrating an internal structure of an imaging lens unit according to a second embodiment of the present invention.

FIG. 4 is a cross-sectional view schematically illustrating an internal structure of an imaging lens unit according to a second embodiment of the present invention. Description of the same or corresponding elements to those of the previous embodiment will be denoted with the same reference numerals, and description of repeated elements will be omitted. In regard to this, the imaging lens unit according to the second embodiment of the present invention will be described hereinafter.

As illustrated in FIG. 4, the imaging lens unit according to the second embodiment of the present invention includes, in order from an object side of an object which is to be formed as an image, a first lens 10b, a second lens 20b, a third lens 30b, a fourth lens 40b, a fifth lens 50b, a filter 60, and an image sensor 70.

In detail, the first lens 10b has positive (+) power, and the second lens 20b has negative (−) power, third lens 30b has positive (+) power, the fourth lens 40b has negative (−) power, and the fifth lens 50b has negative (−) power.

Also, the filter 60 and the image sensor 70 are arranged at the back of the fifth lens 50b.

Also, an aperture stop S that adjusts a light amount of incident light incident from an object to be formed as an image and a focal depth may be disposed toward the object side to be separated at a predetermined distance from the first lens 10b.

Table 4 below shows design data of the lenses of the imaging lens unit according to the second embodiment of the present invention.

TABLE 4

| Lens number | Lens surface number | Curvature radius (mm) | Thickness (mm) | Index | Abbe number |
|---|---|---|---|---|---|
| First lens | S1 | 1.816 | 0.900 | 1.534 | 56.200 |
|  | S2 | −5.547 | 0.054 |  |  |
| Second lens | S3 | −97.166 | 0.400 | 1.614 | 25.600 |
|  | S4 | 2.856 | 0.361 |  |  |
| Third lens | S5 | −8.294 | 0.525 | 1.534 | 56.200 |
|  | S6 | −4.105 | 0.272 |  |  |
| Fourth lens | S7 | −2.584 | 0.900 | 1.614 | 25.600 |
|  | S8 | −3.098 | 0.150 |  |  |
| Fifth lens | S9 | 3.311 | 0.900 | 1.534 | 56.200 |
|  | S10 | 1.662 | 0.300 |  |  |
| Filter | S11 |  | 0.300 | 1.517 | 64.197 |
|  | S12 |  | 0.700 |  |  |

Table 5 below shows aspheric constants of the lenses of the imaging lens unit according to the second embodiment of the present invention.

TABLE 5

| Lens number | Lens surface number | K | A | B | C | D | E | F |
|---|---|---|---|---|---|---|---|---|
| First lens | S1 | −1.0273E+00 | 1.3839E−02 | −9.1788E−03 | 8.0117E−03 | −1.4801E−02 |  |  |
|  | S2 | −2.9977E+01 | 1.6039E−02 | −7.8975E−02 | 1.8846E−02 | 2.9650E−04 |  |  |
| Second lens | S3 | 0.0000E+00 | 4.0689E−02 | −5.3059E−02 | −1.1937E−03 | 2.1356E−02 |  |  |
|  | S4 | 5.3062E+00 | −1.8141E−02 | 2.2376E−02 | −2.7022E−02 | 1.1053E−02 |  |  |
| Third lens | S5 | 0.0000E+00 | −3.5015E−02 | −2.0312E−02 | 3.5575E−02 | −2.2585E−02 |  |  |
|  | S6 | 0.0000E+00 | 5.6233E−02 | −1.2617E−01 | 7.4023E−02 | −2.0183E−02 |  |  |
| Fourth lens | S7 | −2.3140E+01 | 1.0244E−02 | −4.6689E−02 | −3.7693E−02 | 3.8980E−02 | −1.3645E−02 |  |
|  | S8 | −1.6824E+01 | 1.8939E−02 | −2.9754E−02 | 7.9458E−03 | −8.5824E−04 | 4.4694E−05 |  |
| Fifth lens | S9 | −1.2507E+00 | −1.0725E−01 | 2.3608E−02 | −3.6392E−03 | 4.5632E−04 | −2.9218E−05 |  |
|  | S10 | −6.5984E+00 | −3.9477E−02 | 7.0115E−03 | −1.0061E−03 | 6.4242E−05 | −1.6654E−06 |  |

Below, Table 6 shows focal lengths (Focal Length Tolerance, EFL) of the lenses of the imaging lens unit according to the second embodiment of the present invention and according to the above conditional expressions.

TABLE 6

| Lens number | Focal length |
|---|---|
| First lens | 2.629 |
| Second lens | −4.619 |
| Third lens | 14.584 |
| Fourth lens | −75.715 |
| Fifth lens | −7.714 |
| Ass'y | 4.9479 |

Figure 5:
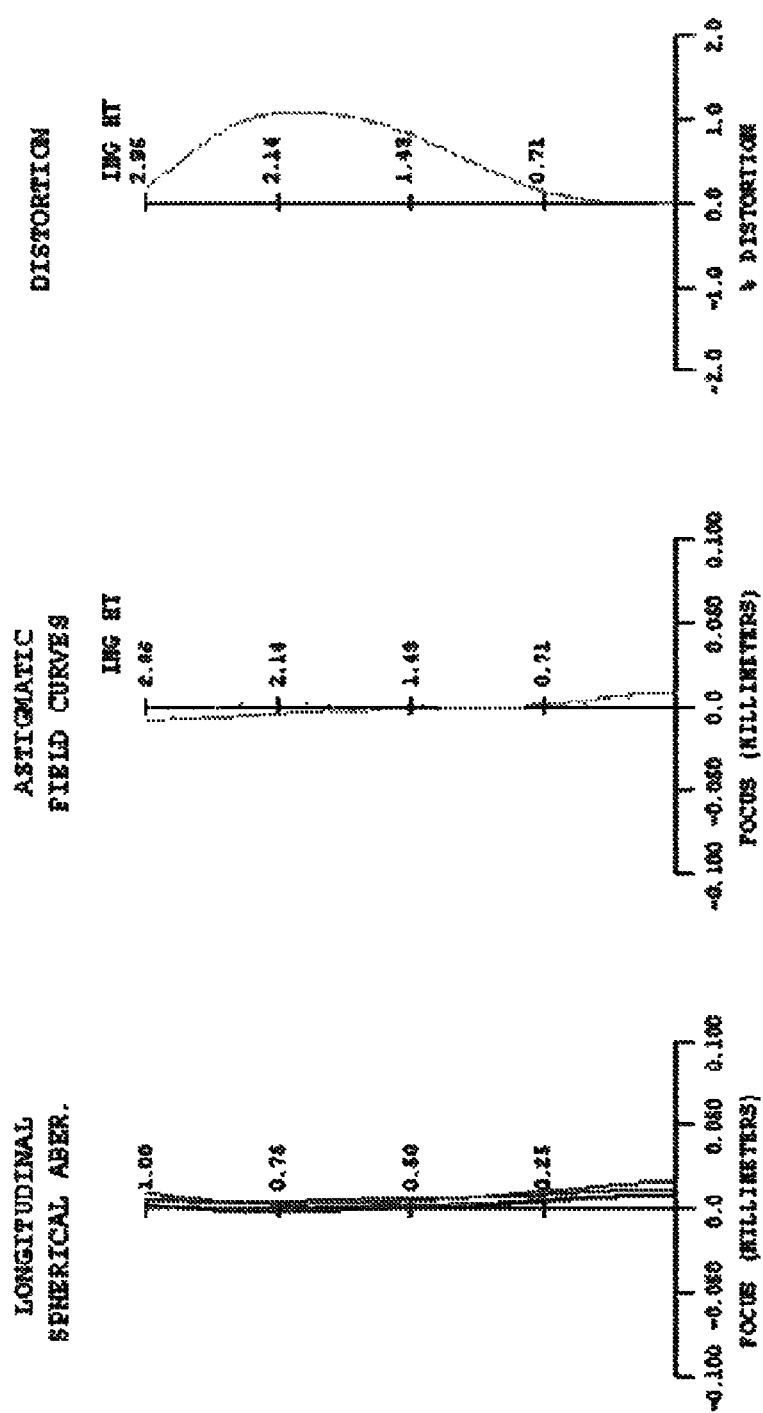
FIG. 5 is a graph showing aberrations of the imaging lens unit according to the second embodiment of the present invention.

FIG. 5 is a graph showing aberrations of the imaging lens unit according to the second embodiment of the present invention. As illustrated in FIG. 5, the graph shows longitudinal spherical aberration, astigmatic field curves, and distortion.

A Y-axis of the graph of FIG. 5 denotes an image height, and an X-axis denotes a focal length (unit: mm) and distortion (unit: %).

Also, with regard to interpretation of the graph of FIG. 5, it may be interpreted that the closer the curves of the graph are to the Y-axis, the better is an aberration correction function. Referring to the graph of FIG. 5, experimental data values measured according to the second embodiment of the present invention are close to the Y-axis in almost all areas.

Accordingly, the imaging lens unit according to the second embodiment of the present invention has excellent characteristics regarding spherical aberration, astigmatism, and distortion.

Figure 6:
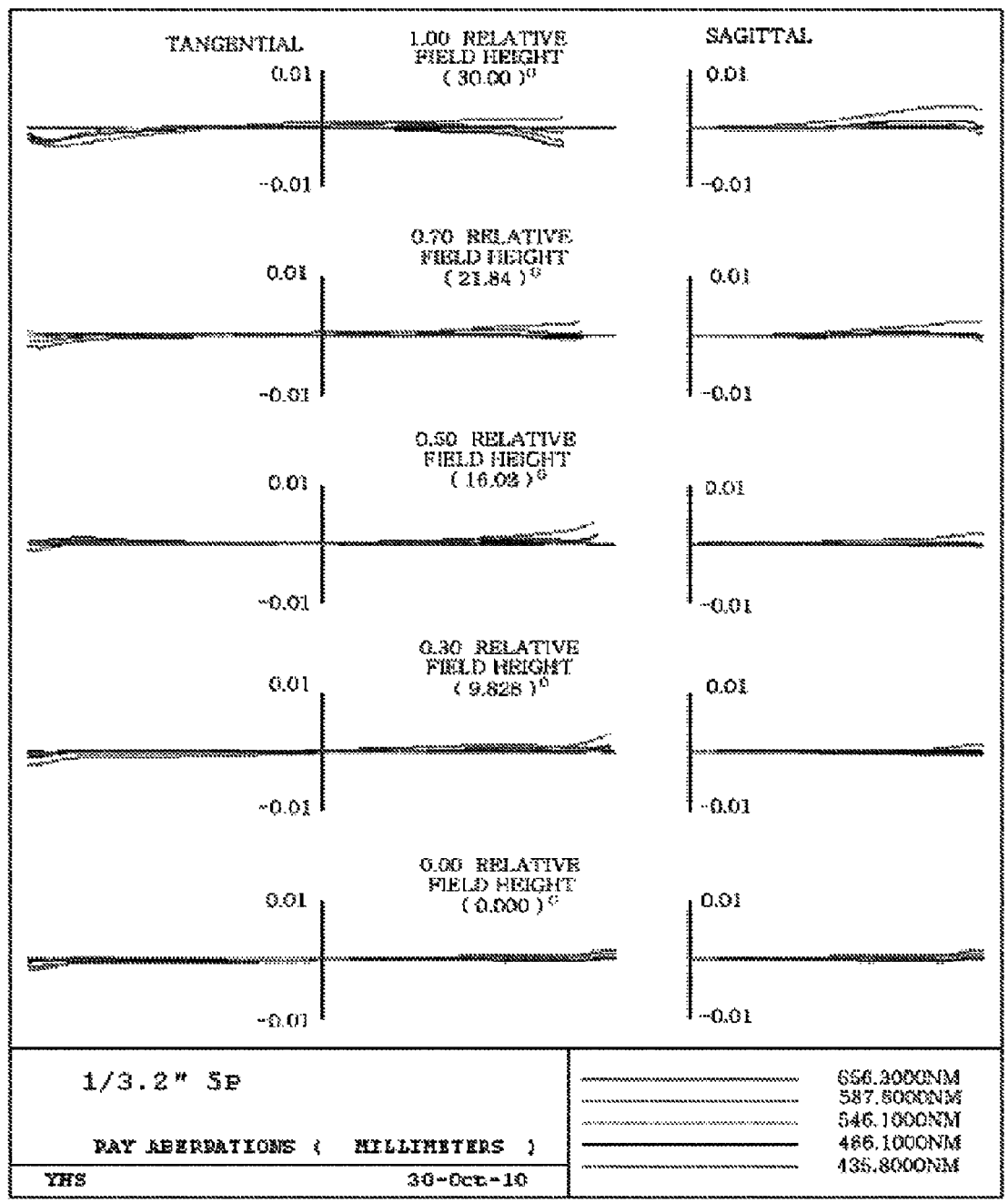
FIG. 6 is a graph showing coma aberration of the imaging lens unit according to the second embodiment of the present invention.

FIG. 6 is a graph showing coma aberration of the imaging lens unit according to the second embodiment of the present invention. As illustrated in FIG. 6, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 6, experimental data values measured according to the second embodiment of the present invention are close to the X-axis in almost all areas.

Thus, the imaging lens unit according to the second embodiment of the present invention provides an excellent coma aberration correction function.

Third Embodiment

Figure 7:
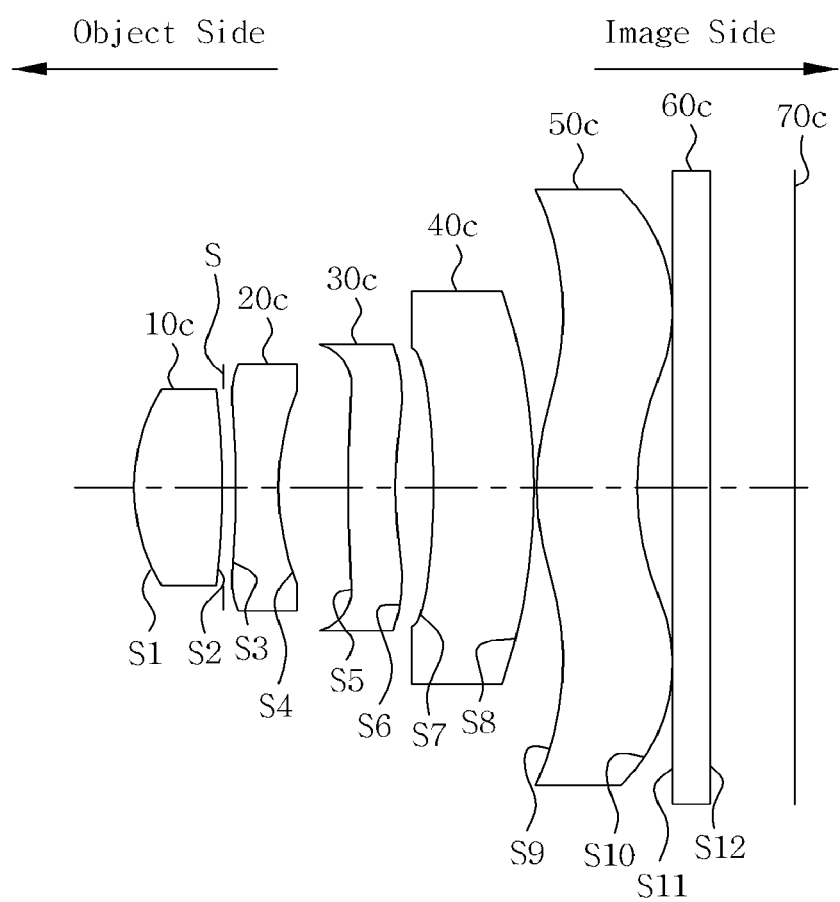
FIG. 7 is a cross-sectional view schematically illustrating an internal structure of an imaging lens unit according to a third embodiment of the present invention.

FIG. 7 is a cross-sectional view schematically illustrating an internal structure of an imaging lens unit according to a third embodiment of the present invention. Description of the same or corresponding elements to those of the previous embodiments will be denoted with the same reference numerals, and description of repeated elements will be omitted. In regard to this, the imaging lens unit according to the third embodiment of the present invention will be described hereinafter.

As illustrated in FIG. 7, the imaging lens unit according to the third embodiment of the present invention includes, in order from an object side of an object which is to be formed as an image, a first lens 10c, a second lens 20c, a third lens 30c, a fourth lens 40c, a fifth lens 50c, a filter 60, and an image sensor 70.

In detail, the first lens 10c has positive (+) power, and the second lens 20c has negative (−) power, third lens 30c has negative (−) power, the fourth lens 40c has negative (−) power, and the fifth lens 50c has negative (−) power.

Also, an aperture stop S that adjusts a light amount of incident light incident from an object to be formed as an image and a focal depth may be disposed between the first lens 10c and the second lens 20c.

Also, the filter 60 and the image sensor 70 are arranged at the back of the fifth lens 50c.

Table 7 below shows design data of the lenses of the imaging lens unit according to the third embodiment of the present invention.

TABLE 7

| Lens number | Lens surface number | Curvature radius (mm) | Thickness (mm) | Index | Abbe number |
|---|---|---|---|---|---|
| First lens | S1 | 1.730 | 0.752 | 1.534 | 56.200 |
| | S2 | −8.569 | 0.050 | | |
| Aperture stop | S3 | INFINITY | 0.061 | | |
| Second lens | S4 | −13.180 | 0.400 | 1.614 | 25.600 |
| | S5 | 3.528 | 0.620 | | |
| Third lens | S6 | 5.570 | 0.400 | 1.534 | 56.200 |
| | S7 | 4.920 | 0.307 | | |
| Fourth lens | S8 | −4.191 | 0.900 | 1.614 | 25.600 |
| | S9 | −5.275 | 0.050 | | |
| Fifth lens | S10 | 2.036 | 0.855 | 1.534 | 56.200 |
| | S11 | 1.702 | 0.300 | | |
| Filter | S12 | | 0.300 | 1.517 | 64.197 |
| | S13 | | 0.700 | | |

Table 8 below shows aspheric constants of the lenses of the imaging lens unit according to the third embodiment of the present invention.

TABLE 8

| Lens number | Lens surface number | K | A | B | C | D | E | F |
|---|---|---|---|---|---|---|---|---|
| First lens | S1 | −9.4427E−01 | 1.5322E−02 | −8.2026E−03 | 9.9253E−03 | −1.7307E−02 | | |
| | S2 | 5.7561E+00 | 2.3480E−03 | 7.0525E−03 | −4.8277E−02 | 1.8181E−02 | | |
| Aperture stop | S3 | | | | | | | |
| Second lens | S4 | 0.0000E+00 | 2.5677E−02 | 3.7071E−02 | −6.9411E−02 | 4.4068E−02 | | |
| | S5 | 8.7002E+00 | −6.2934E−04 | 4.2185E−02 | 4.2185E−02 | 3.0125E−02 | | |
| Third lens | S6 | 0.0000E+00 | −8.9747E−02 | −3.8532E−02 | 5.7459E−02 | −3.3302E−02 | | |
| | S7 | 0.0000E+00 | −1.1576E−02 | −1.0527E−01 | 7.4150E−02 | −1.9678E−02 | | |
| Fourth lens | S8 | −7.0912E+01 | 4.3019E−02 | −3.8067E−02 | −4.4898E−02 | 4.3045E−02 | −1.0699E−02 | |
| | S9 | −2.0574E+01 | 3.9125E−02 | −3.4167E−02 | 8.2237E−03 | −6.7424E−04 | −8.5788E−06 | |
| Fifth lens | S10 | −4.0068E+00 | −7.0899E−02 | 2.0161E−02 | −4.0410E−03 | 4.8831E−04 | −2.4990E−05 | |
| | S11 | −4.8559E+00 | −4.3280E−02 | 9.4989E−03 | −1.5821E−03 | 1.2507E−04 | −4.0178E−06 | |

Table 9 below shows focal lengths (Focal Length Tolerance, EFL) of the lenses of the imaging lens unit according to the third embodiment of the present invention and according to the above conditional expressions.

TABLE 9

| Lens number | Focal length |
|---|---|
| First lens | 2.766 |
| Second lens | −4.492 |
| Third lens | −100.348 |
| Fourth lens | −48.560 |
| Fifth lens | −180.664 |
| Ass'y | 4.9446 |

Figure 8:
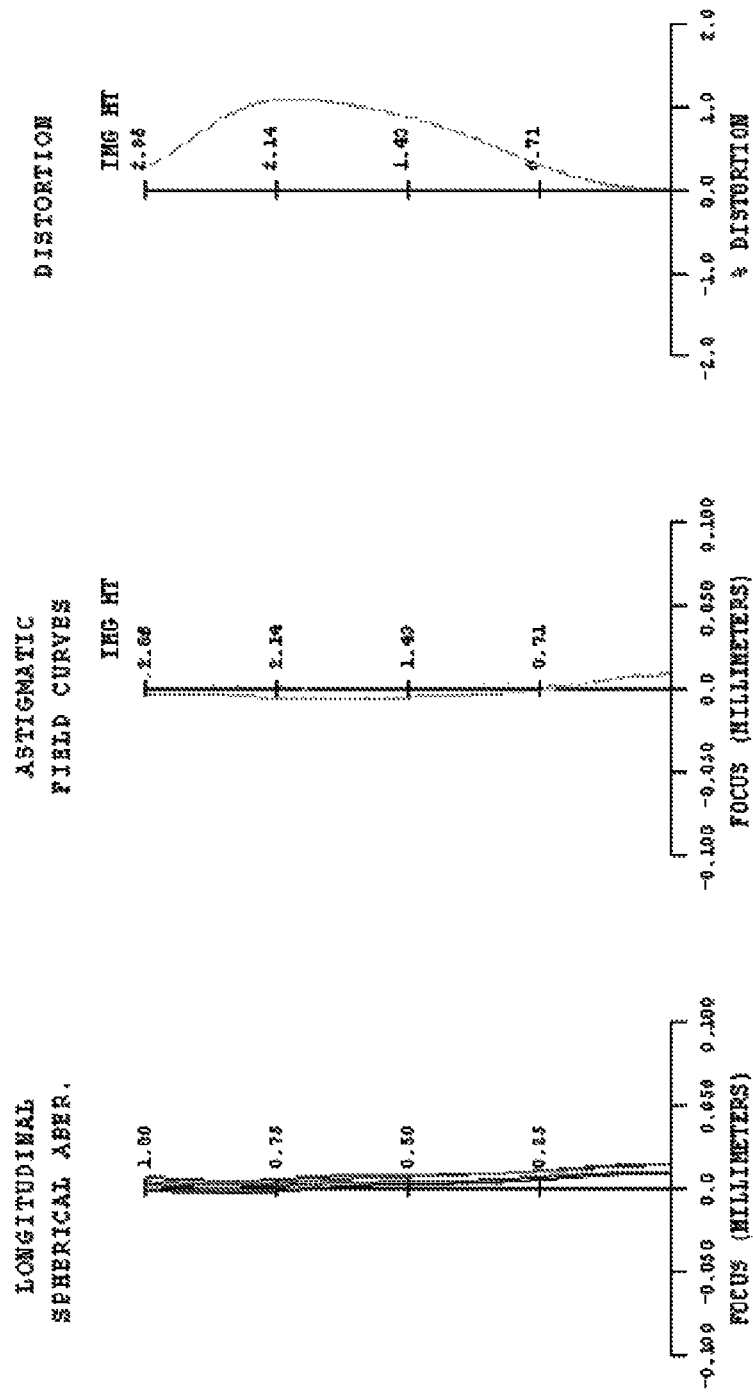
FIG. 8 is a graph showing aberrations of the imaging lens unit according to the third embodiment of the present invention.

FIG. 8 is a graph showing aberrations of the imaging lens unit according to the third embodiment of the present invention. As illustrated in FIG. 8, the graph shows longitudinal spherical aberration, astigmatic field curves, and distortion.

A Y-axis of the graph of FIG. 8 denotes an image height, and an X-axis denotes a focal length (unit: mm) and distortion (unit: %).

Also, with regard to interpretation of the graph of FIG. 8, it may be interpreted that the closer the curves of the graph are to the Y-axis, the better is an aberration correction function. Referring to the graph of FIG. 8, experimental data values measured according to the third embodiment of the present invention are close to the Y-axis in almost all areas.

Accordingly, the imaging lens unit according to the third embodiment of the present invention has excellent characteristics regarding spherical aberration, astigmatism, and distortion.

Figure 9:
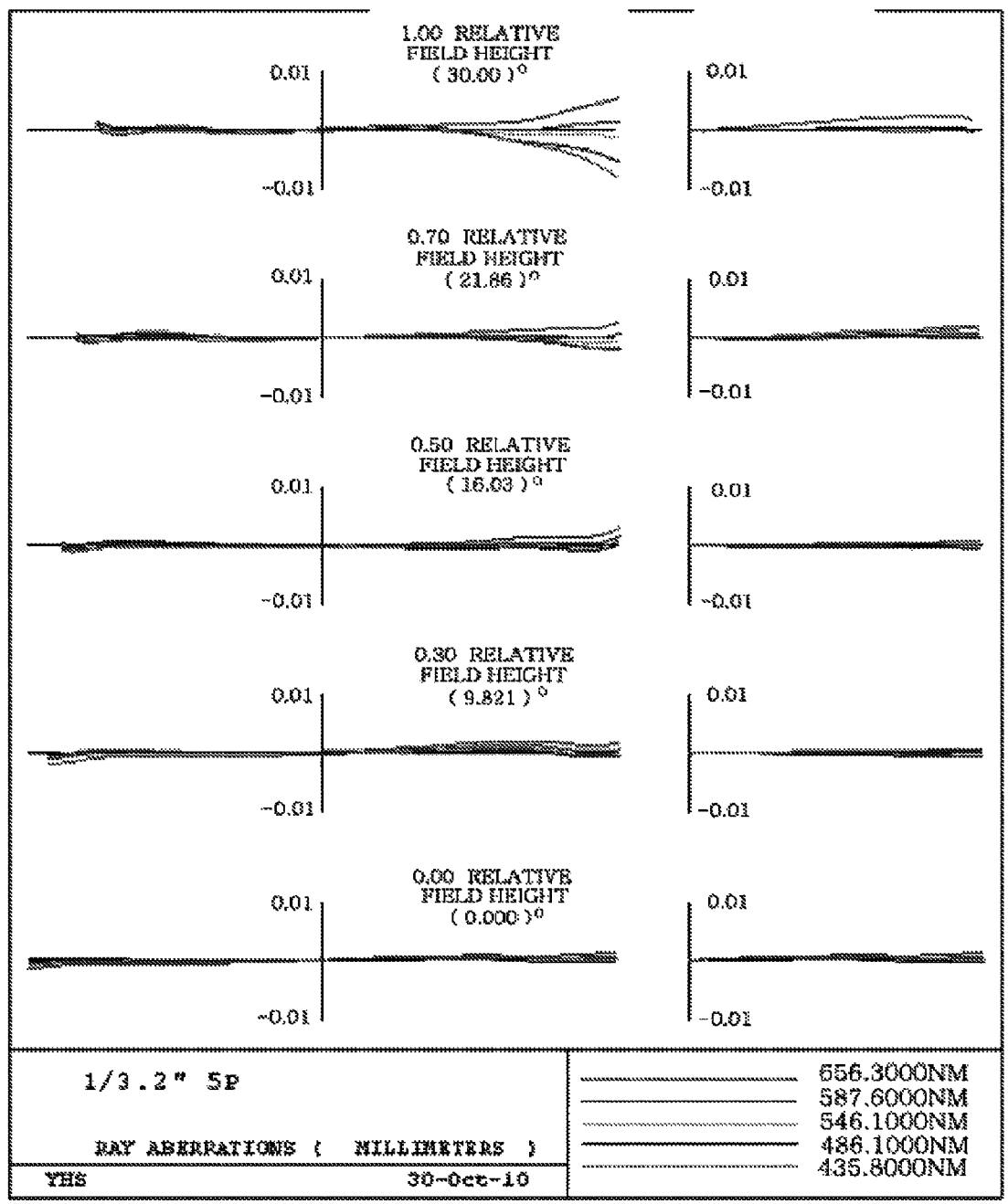
FIG. 9 is a graph showing coma aberration of the imaging lens unit according to the third embodiment of the present invention.

FIG. 9 is a graph showing coma aberration of the imaging lens unit according to the third embodiment of the present invention. As illustrated in FIG. 9, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 9, experimental data values measured according to the third embodiment of the present invention are close to the X-axis in almost all areas.

Thus, the imaging lens unit according to the third embodiment of the present invention provides an excellent coma aberration correction function.

Fourth Embodiment

Figure 10:
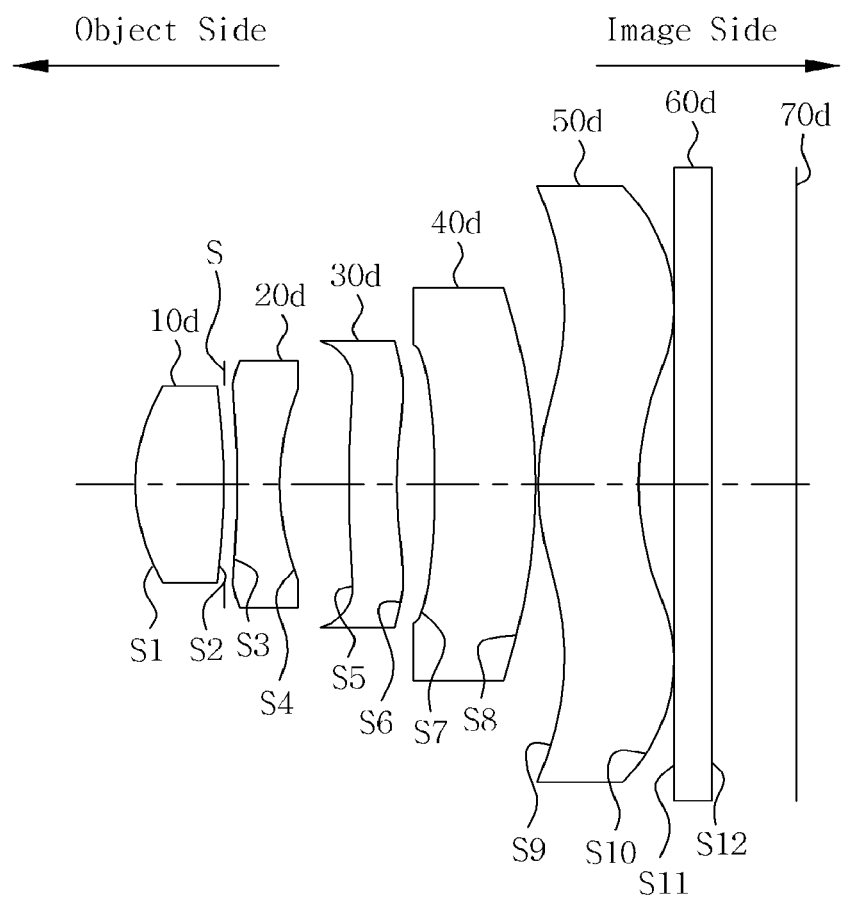
FIG. 10 is a cross-sectional view schematically illustrating an internal structure of an imaging lens unit according to a fourth embodiment of the present invention.

FIG. 10 is a cross-sectional view schematically illustrating an internal structure of an imaging lens unit according to a fourth embodiment of the present invention. Description of the same or corresponding elements to those of the previous embodiment will be denoted with the same reference numerals, and description of repeated elements will be omitted. In regard to this, the imaging lens unit according to the fourth embodiment of the present invention will be described hereinafter.

As illustrated in FIG. 10, the imaging lens unit according to the fourth embodiment of the present invention includes, in order from an object side of an object which is to be formed as an image, a first lens 10d, a second lens 20d, a third lens 30d, a fourth lens 40d, a fifth lens 50d, a filter 60, and an image sensor 70.

In detail, the first lens 10d has positive (+) power, and the second lens 20d has negative (−) power, third lens 30d has positive (+) power, the fourth lens 40d has negative (−) power, and the fifth lens 50d has negative (−) power.

Also, an aperture stop S that adjusts a light amount of incident light incident from an object to be formed as an image and a focal depth may be disposed between the first lens 10d and the second lens 20d.

Also, the filter 60 and the image sensor 70 are arranged at the back of the fifth lens 50d.

Table 10 below shows design data of the lenses of the imaging lens unit according to the fourth embodiment of the present invention.

TABLE 10

| Lens number | Lens surface number | Curvature radius (mm) | Thickness (mm) | Index | Abbe number |
|---|---|---|---|---|---|
| First lens | S1 | 1.649 | 0.692 | 1.534 | 56.200 |
|  | S2 | −17.857 | 0.050 |  |  |
| Aperture stop | S3 | INFINITY | 0.060 |  |  |
| Second lens | S4 | −33.464 | 0.400 | 1.614 | 25.600 |
|  | S5 | 3.069 | 0.660 |  |  |
| Third lens | S6 | 5.521 | 0.435 | 1.534 | 56.200 |
|  | S7 | 7.247 | 0.324 |  |  |
| Fourth lens | S8 | −2.864 | 0.838 | 1.614 | 25.600 |
|  | S9 | −3.554 | 0.050 |  |  |
| Fifth lens | S10 | 2.093 | 0.891 | 1.534 | 56.200 |
|  | S11 | 1.634 | 0.300 |  |  |
| Filter | S12 |  | 0.300 | 1.517 | 64.197 |
|  | S13 |  | 0.700 |  |  |

Table 11 below shows aspheric constants of the lenses of the imaging lens unit according to the fourth embodiment of the present invention.

TABLE 12

| Lens number | Focal length |
|---|---|
| First lens | 2.863 |
| Second lens | −4.560 |
| Third lens | 39.909 |
| Fourth lens | −44.664 |
| Fifth lens | −43.002 |
| Ass'y | 4.9475 |

Figure 11:
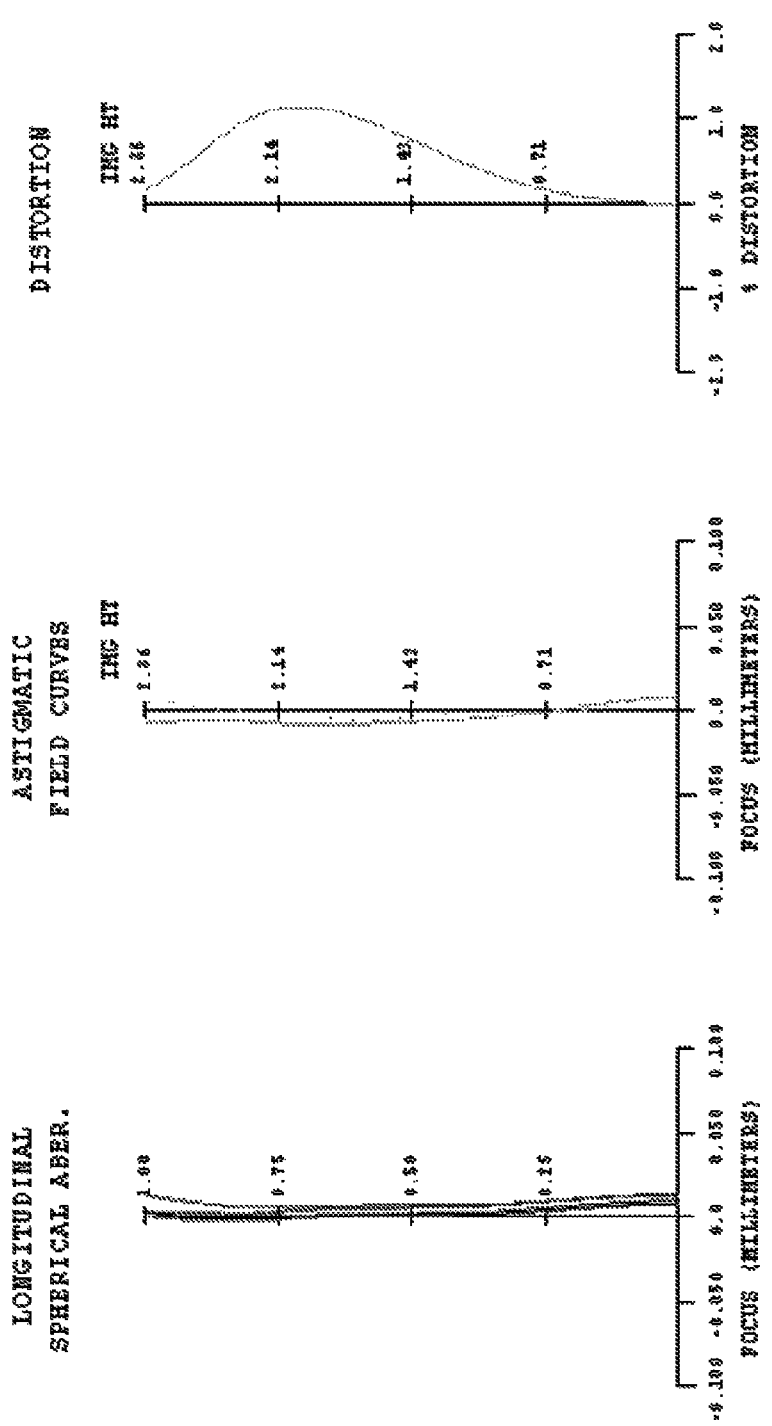
FIG. 11 is a graph showing aberrations of the imaging lens unit according to the fourth embodiment of the present invention.

FIG. 11 is a graph showing aberrations of the imaging lens unit according to the fourth embodiment of the present invention. As illustrated in FIG. 11, the graph shows longitudinal spherical aberration, astigmatic field curves, and distortion.

A Y-axis of the graph of FIG. 11 denotes an image height, and an X-axis denotes a focal length (unit: mm) and distortion (unit: %).

Also, with regard to interpretation of the graph of FIG. 11, it may be interpreted that the closer the curves of the graph are to the Y-axis, the better is an aberration correction function. Referring to the graph of FIG. 11, experimental data values measured according to the fourth embodiment of the present invention are close to the Y-axis in almost all areas.

Accordingly, the imaging lens unit according to the fourth embodiment of the present invention has excellent characteristics regarding spherical aberration, astigmatism, and distortion.

Figure 12:
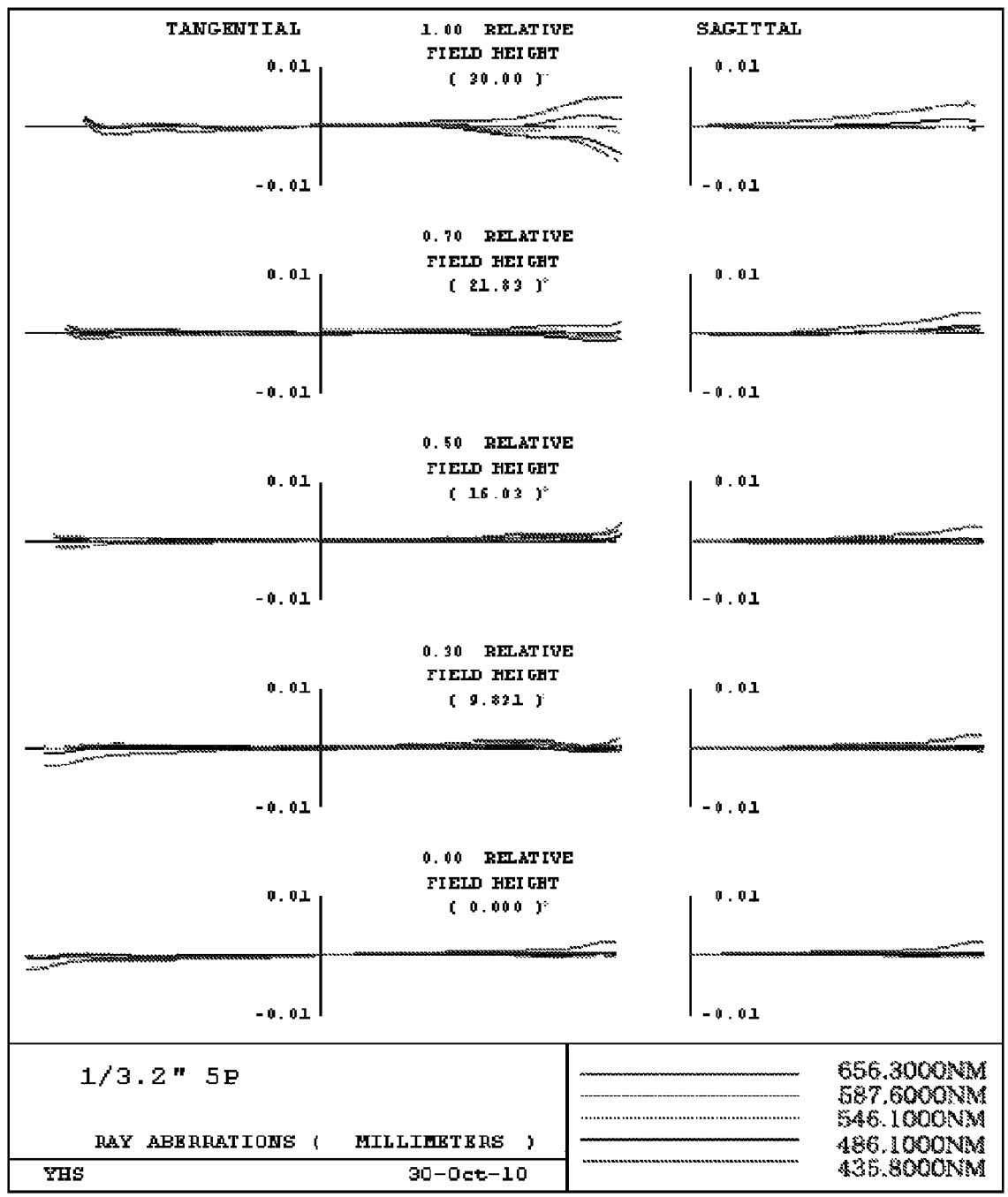
FIG. 12 is a graph showing coma aberration of the imaging lens unit according to the fourth embodiment of the present invention.

FIG. 12 is a graph showing coma aberration of the imaging lens unit according to the fourth embodiment of the present invention. As illustrated in FIG. 12, aberrations of tangential components and sagittal components of the imaging lens unit were measured according to a field height of an image plane.

With regard to interpretation of the graph of coma aberration, it may be interpreted that the closer the curves of the graph are to the X-axis on a positive axis and a negative axis, the better is the function of correcting coma aberration. Referring to the graph of FIG. 12, experimental data values measured according to the fourth embodiment of the present invention are close to the X-axis in almost all areas.

Thus, the imaging lens unit according to the fourth embodiment of the present invention provides an excellent coma aberration correction function.

According to the preferred embodiments of the present invention, as the imaging lens unit including five lenses is

TABLE 11

| Lens number | Lens surface number | K | A | B | C | D | E | F |
|---|---|---|---|---|---|---|---|---|
| First lens | S1 | −7.3137E−01 | 2.1043E−02 | −2.1087E−03 | 1.4879E−02 | −1.3640E−02 |  |  |
|  | S2 | 6.3414E+01 | −9.2536E−03 | 4.0018E−02 | −5.2746E−02 | 1.1953E−02 |  |  |
| Aperture stop | S3 |  |  |  |  |  |  |  |
| Second lens | S4 | 0.0000E+00 | −2.5029E−02 | 8.3666E−02 | −9.5937E−02 | 4.0994E−02 |  |  |
|  | S5 | 6.3117E+00 | −3.3108E−02 | 6.4702E−02 | −6.4244E−02 | 3.3962E−02 |  |  |
| Third lens | S6 | 0.0000E+00 | −6.7692E−02 | 6.4702E−02 | 5.5436E−02 | −2.7922E−02 |  |  |
|  | S7 | 0.0000E+00 | 2.9193E−02 | −1.2470E−01 | 7.7632E−02 | −1.8549E−02 |  |  |
| Fourth lens | S8 | −3.3044E+01 | 5.9958E−02 | −4.7098E−02 | −3.3764E−02 | 3.5789E−02 | −8.7537E−03 |  |
|  | S9 | −2.4258E+01 | 4.0732E−02 | −3.4555E−02 | 8.3201E−03 | −6.6003E−04 | −1.1978E−05 |  |
| Fifth lens | S10 | −4.4930E+00 | −6.1268E−02 | 1.7272E−02 | −3.9021E−03 | 5.2804E−04 | −2.8354E−05 |  |
|  | S11 | −6.2953E+00 | −3.0681E−02 | 5.4197E−03 | −9.2536E−04 | 5.8930E−05 | −8.3315E−07 |  |

Below, Table 12 shows focal lengths (Focal Length Tolerance, EFL) of the lenses of the imaging lens unit according to the fourth embodiment of the present invention and according to the above conditional expressions.

provided, a compact optical system that is suitable for portable terminals, a compact camera module, and a high resolving power may be provided.

Although the embodiment of the present invention has been disclosed for illustrative purposes, it will be appreciated that the imaging lens unit according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed:

1. An image lens unit, comprising:
   a first lens having positive (+) power and being convex toward an object side;
   a second lens having negative (−) power and being concave toward an image side;
   a third lens having positive (+) power and being concave near an axial perimeter toward the object side;
   a fourth lens having negative (−) power and a meniscus shape being concave in the center toward the object side and convex toward the image side; and
   a fifth lens having a refractive power and being convex toward the object side and concave toward the image side,
   wherein:
   an Abbe number v2 of the second lens satisfies the following conditional expression:

$0 < v2 < 30$, at least one inflection point is formed on an image-side surface of the fifth lens, and
   the first lens, the second lens, the third lens, the fourth lens and the fifth lens are arranged in order from the object side toward the image side.

2. The image lens unit of claim 1, wherein:
   an object-side surface of the fifth lens is convex in the center and concave at the periphery, and
   the image-side surface of the fifth lens is concave in the center and convex at the periphery.

3. The image lens unit of claim 2, wherein the third lens is convex toward the image side.

4. The image lens unit of claim 1, wherein an Abbe number v1 of the first lens satisfies the following conditional expression:

$50 < v1$.

5. The image lens unit of claim 4, wherein an Abbe number v4 of the fourth lens satisfies the following conditional expression:

$0 < v4 < 30$.

6. The image lens unit of claim 5, wherein the Abbe number v1 of the first lens, the Abbe number v2 of the second lens, an Abbe number v3 of the third lens, and the Abbe number v4 of the fourth lens satisfy the following conditional expression:

$0.7 < (v1+v2)/(v3+v4) < 1.0$.

7. The image lens unit of claim 1, wherein a total focal length f of the imaging lens unit and a distance tt on an optical axis from an object-side surface of the first lens to an imaging sensor satisfy the following conditional expression:

$0 < tt/f < 1.3$.

8. The image lens unit of claim 1, wherein the second lens, the third lens, and the fourth lens are made of a plastic material.

9. The image lens unit of claim 8, wherein the first lens is made of a plastic material.

10. The image lens unit of claim 1, wherein the second lens and the fourth lens are formed of a high dispersion material.

11. The image lens unit of claim 1, further comprising an aperture stop disposed in front of the first lens.

12. The image lens unit of claim 1, wherein a focal length of the first lens is greater than a focal length of the second lens.

13. The image lens unit of claim 12, wherein the focal length of the second lens is greater than a focal length of the fourth lens.

14. The image lens unit of claim 1, wherein the second lens has the thinnest thickness among the first lens, the second lens, the third lens, the fourth lens and the fifth lens.

15. An image lens unit, comprising:
    a first lens having positive (+) power and being convex toward an object side;
    a second lens having negative (−) power and being concave toward an image side;
    a third lens having positive (+) power and being concave near an axial perimeter toward the object side and convex toward the image side;
    a fourth lens having negative (−) power and being concave in the center toward the object side and convex toward the image side; and
    a fifth lens having a refractive power and comprising:
    an object-side surface being convex in the center and concave at the periphery; and
    an image-side surface being concave in the center and convex at the periphery, wherein:
    an Abbe number v2 of the second lens and an Abbe number v4 of the fourth lens satisfy the following conditional expressions:

$0 < v2 < 30$ $0 < v4 < 30$ the third and fourth lenses have a meniscus shape, and
    the first lens, the second lens, the third lens, the fourth lens and the fifth lens are arranged in order from the object side toward the image side.

16. The image lens unit of claim 15, wherein an Abbe number v1 of the first lens satisfies the following conditional expression:

$50 < v1$.

17. The image lens unit of claim 16, wherein the Abbe number v1 of the first lens, the Abbe number v2 of the second lens, an Abbe number v3 of the third lens, and the Abbe number v4 of the fourth lens satisfy the following conditional expression:

$0.7 < (v1+v2)/(v3+v4) < 1.0$.

18. The image lens unit of claim 15, wherein a total focal length f of the imaging lens unit and a distance tt on an optical axis from an object-side surface of the first lens to an imaging sensor satisfy the following conditional expression:

$0 < tt/f < 1.3$.

19. The image lens unit of claim 15, wherein the second lens, the third lens, and the fourth lens are made of a plastic material.

20. The image lens unit of claim 19, wherein the first lens is made of a plastic material.

21. The image lens unit of claim 15, wherein the second lens and the fourth lens are formed of a high dispersion material.

22. The image lens unit of claim 15, further comprising an aperture stop disposed in front of the first lens.

23. The image lens unit of claim 15, wherein a focal length of the first lens is greater than a focal length of the second lens.

24. The image lens unit of claim 23, wherein the focal length of the second lens is greater than a focal length of the fourth lens.

25. The image lens unit of claim 15, wherein the second lens has the thinnest thickness among the first lens, the second lens, the third lens, the fourth lens and the fifth lens.

* * * * *